United States Patent [19]

Kellar et al.

[11] 4,325,723
[45] Apr. 20, 1982

[54] TRANSFERRING RIGID SHEETS FROM ONE CONVEYOR TO ANOTHER

[75] Inventors: John D. Kellar, Pontypool; Gordon F. Pereman, Columbus, both of Canada

[73] Assignee: PPG Industries, Inc., Pittsburgh, Pa.

[21] Appl. No.: 210,711

[22] Filed: Nov. 26, 1980

[51] Int. Cl.³ .................. C03B 23/03; C03B 27/00
[52] U.S. Cl. ............................ 65/104; 65/58;
65/114; 65/273; 65/351; 198/412; 198/477;
198/486; 198/680
[58] Field of Search .............. 65/104, 58, 114–273,
65/349, 350, 351; 198/412, 477, 486, 649, 680

[56] References Cited

U.S. PATENT DOCUMENTS

| 1,128,448 | 2/1915 | Hitchcock | 198/649 X |
|---|---|---|---|
| 3,097,943 | 7/1963 | Dean et al. | 65/58 X |
| 3,178,045 | 4/1965 | Davidson, Jr. et al. | 214/89 |
| 3,257,187 | 6/1966 | Montgomery et al. | 65/58 X |
| 3,530,970 | 9/1970 | Richardson et al. | 198/20 |
| 3,610,393 | 10/1971 | Richardson et al. | 198/20 |
| 3,782,916 | 1/1974 | Powell et al. | 64/273 X |
| 3,880,635 | 4/1975 | Jack et al. | 65/104 X |
| 3,912,089 | 10/1975 | Lineberry et al. | 198/486 X |
| 4,094,659 | 6/1978 | Nixon et al. | 65/114 X |

FOREIGN PATENT DOCUMENTS 427635 5/1945 Canada .
964683 3/1975 Canada .

*Primary Examiner*—Arthur D. Kellogg
*Attorney, Agent, or Firm*—Edward I. Mates

[57] ABSTRACT

Transferring rigid glass sheets from a first conveyor where the sheets are conveyed in end to end relation along a first conveyor through a first treatment apparatus where the sheets are suspended by tongs to a second conveyor where the sheets are conveyed in a broadside relation along a path parallel to and beyond the first conveyor. Such a conveyor system utilizes plant space efficiently.

10 Claims, 9 Drawing Figures

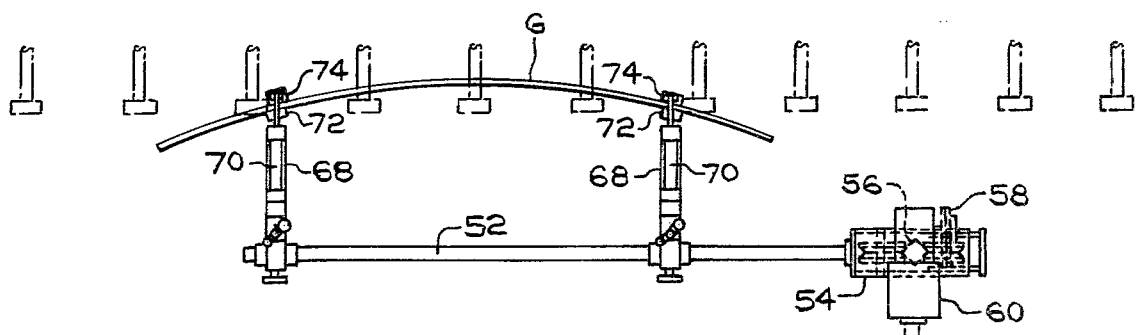
Fig. 5
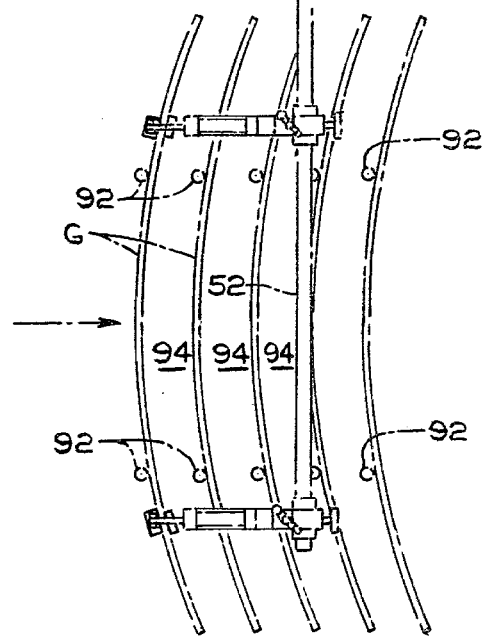
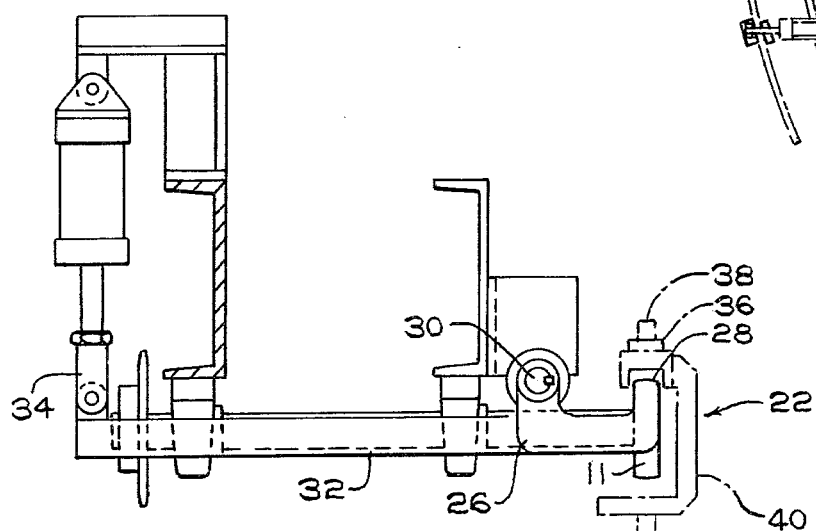
Fig. 3

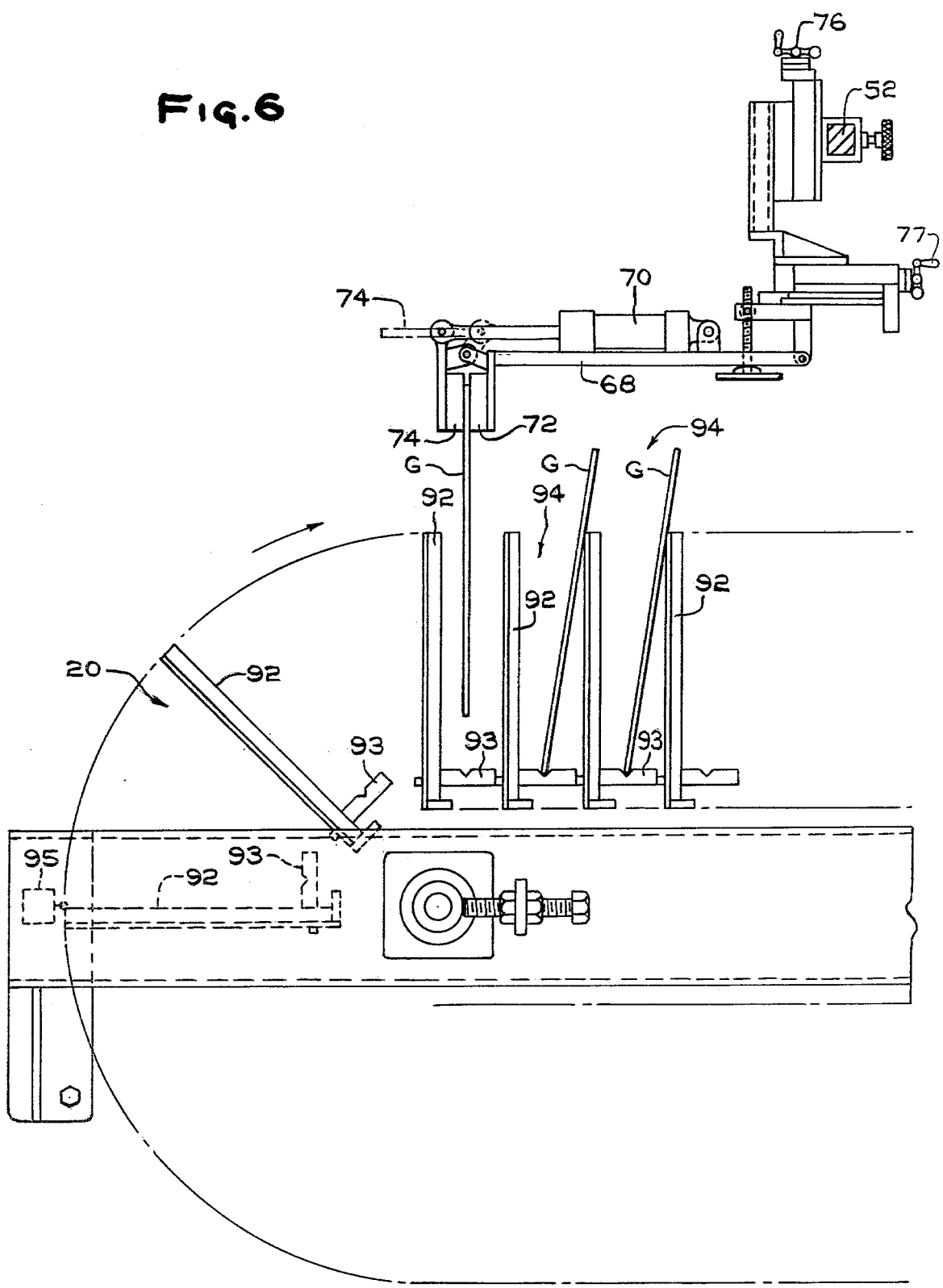

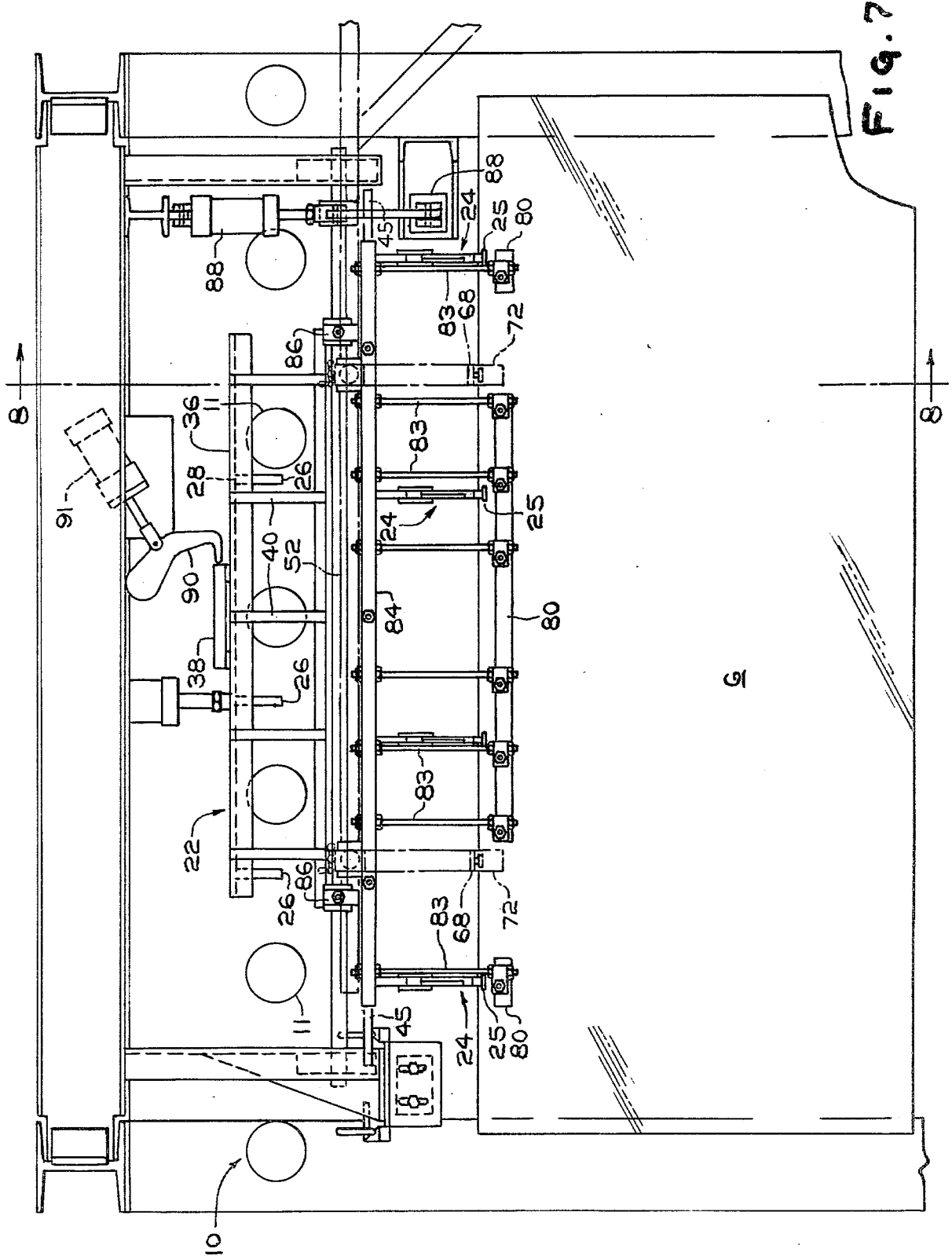

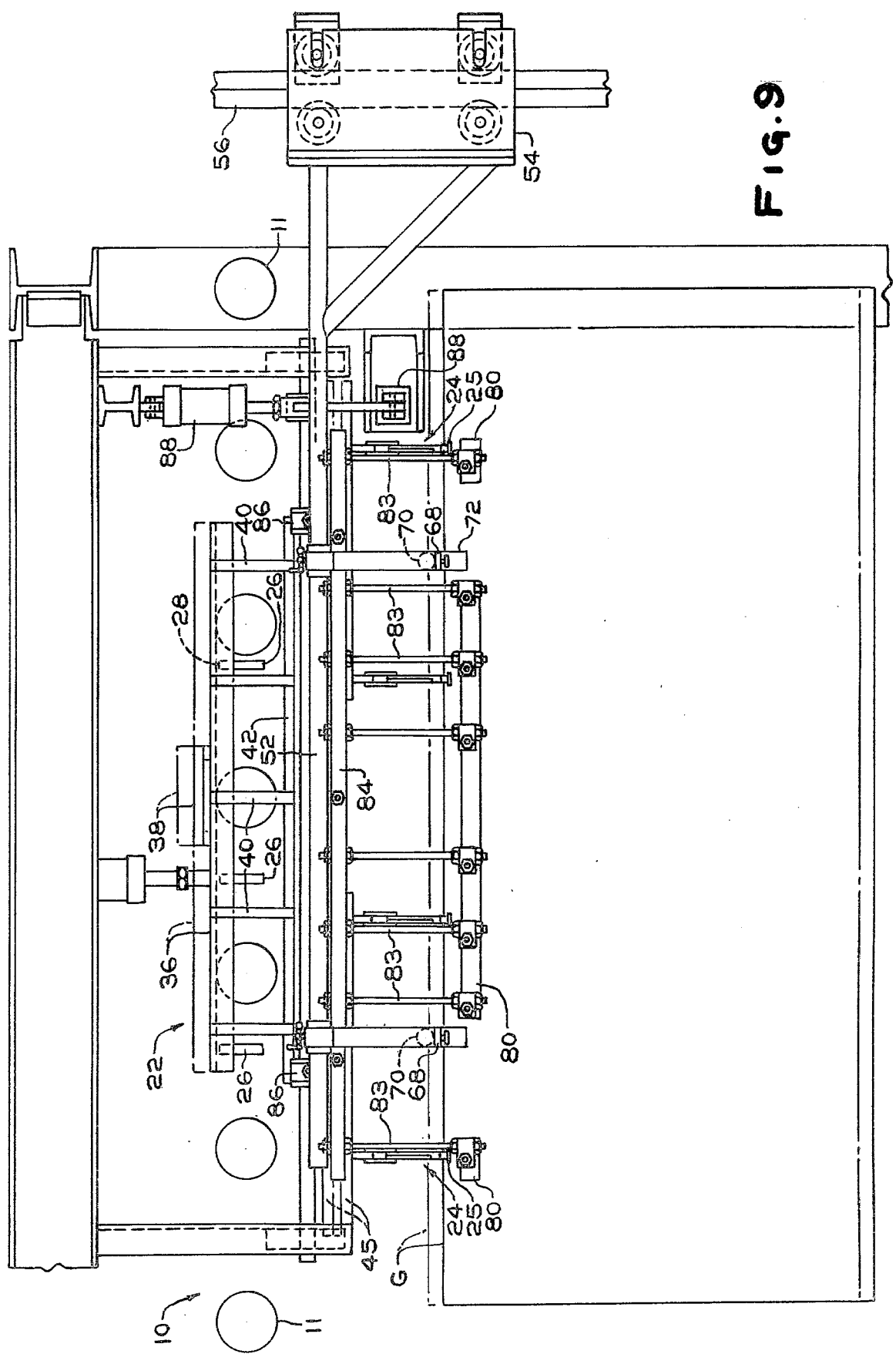

0
TRANSFERRING RIGID SHEETS FROM ONE CONVEYOR TO ANOTHER

BACKGROUND OF THE INVENTION

1. Field of the Invention

This invention relates to a transfer of rigid sheets from a first conveyor for moving said sheets in end to end relation along a first path while the sheets are gripped by tongs suspended from carriages to a second conveyor for moving said rigid sheets in a broadside direction along a second path parallel to the first path wherein the sheets are supported in an upright position along their lower edge. The present invention has special utility in glass sheet handling apparatus, preferably apparatus for handling glass sheets for further cooling after previous thermal treatment.

Usually, glass sheets are gripped by tongs for movement in end to end relation along a conveyor extending through a tunnel-like furnace where the glass sheets are heated to a temperature sufficient for shaping and/or tempering. When the leading glass sheet of a series of glass sheets reaches the exit of the furnace, it is within an elevated temperature range sufficient for it to be shaped to a shape desired for a curved window for an automobile side light or rear backlight or any other shape that might be desired for a glass sheet. The glass sheet so heated is shaped by press bending into the desired configuration and then the glass sheet is moved through a first cooling area along an extension of the conveyor where cold tempering medium, such as high velocity air blasts, is directed against the opposite major surfaces of the glass sheet. The glass sheet is then disengaged from the tongs and further cooled in an additional cooling area while being removed from the first cooling area. At the end of the additional cooling area, the glass sheet is inspected and packed for shipment.

If the glass sheets are moved from the first cooling area to the additional cooling area while oriented in the same end to end relation that they have during their movement through the tunnel-like furnace, the plant would have to be excessively long. However, an alternate handling system has been used to transfer the glass sheets from a first conveyor wherein tongs suspended from carriages grip the upper edge portion of the glass sheet for movement in an end to end relation through the first cooling area where the glass sheets are tempered or partially tempered. The disengaged glass sheets are dropped on to a so-called peg conveyor and more broadside for further cooling in a direction transverse to the length of the first conveyor.

This alternate conveyor system involving moving the glass sheets in a first path in end to end relation along a first conveyor and then in a second path normal to the first path along a peg conveyor while the sheets are moved in a broadside direction requires less length for a glass fabrication facility. However, where more than one production line of this type is contemplated, it is impossible to utilize factory space very efficiently, because each furnace and first cooling area would have to be staggered longitudinally of each adjacent furnace and its first cooling area in order to provide clearance for the transversely extending peg conveyors of adjacent lines. Under such circumstances, the first cooling area of one line would have to be located transversely of the hot end of the furnace of an adjacent line in order to economize plant space. Under such circumstances the need for hot temperature controls in a furnace for one production line and cold temperature controls in an adjacent cooling area for an adjacent production line makes it difficult to obtain suitable and efficient temperature control of the first cooling area of the line that is adjacent the hot end of the furnace of the one line consistent with efficient hot temperature control in the furnace.

It would be beneficial for the glass sheet tempering art to develop a conveyor system that would enable heating furnaces to be disposed side by side one another and yet not require the length of the factory to be as long as was required in the prior art. It would also be beneficial for the glass sheet treatment art to develop an alternate technique for handling glass sheets that did not require the glass sheets to be conveyed at right angles to the path taken by the glass sheet through the furnace and first cooling area of tempering apparatus.

The principles enunciated for handling glass sheets would also be suitable for handling any rigid sheet material. Therefore, the principles of this invention are equally suitable for materials other than glass sheets.

2. Description of Patents of Interests

U.S. Pat. No. 3,178,045 to Charles R. Davidson Jr. and William P. Mitchell discloses sheet handling apparatus in which a series of glass sheets are conveyed through a hot atmosphere for heating to a temperature sufficient for tempering and then through a cooling area where cold tempering medium is applied toward the glass sheets to impart at least a partial temper thereto. A peg conveyor shown in FIGS. 12 and 13 extends transversely from an unloading station through an additional cooling area. Means is provided to release the glass sheet from tongs so that the sheets are supported on their lower edge for transverse conveyance in a broadside direction along a second path transverse to the first path.

U.S. Pat. Nos. 3,530,970 and 3,610,393 to Ronald E. Richardson, Gordon F. Pereman, John D. Kellar, and Jan G. Borremans disclose and claim apparatus and method, respectively, of an alternate way to transfer glass sheets conveyed along a first path for tempering while gripped by tongs for release from the tongs and transfer to a peg conveyor to move along a second path extending transverse to the first path where the glass sheets released from tongs are supported on their bottom edges for broadside movement in a direction transverse to the first path.

Since the second path provided by the peg conveyor in each of the aforesaid patents extends in a direction transverse to the direction of the first path for conveying sheets for heat treatment operations such as involved in tempering or heat strengthening, a factory for fabricating tempered or heat strengthened glass sheets would have to have adjacent lines of production offset from one another both at their loading end at the beginning of the first path and at their unloading end. This would require an awkward arrangement of inventory of glass sheets to be handled prior to the fabrication operation. While it may be suitable for a production plant having one production line, a better arrangement would be needed if production requirements become so great as to require a second production line.

Other art called to the attention of applicant's attorney include Canadian Pat. No. 427,635 to William L. MacDemara which covers a device for transferring glass containers and Canadian Pat. No. 964,683 to Emoul J. Andersson et al. which discloses robot devices capable of providing various combinations of movement. It is considered that the robot devices of this patent would not necessarily perform the handling of rigid sheets to be described subsequently.

SUMMARY OF THE INVENTION

The present invention economizes space needed for the thermal handling of rigid sheets, particularly glass sheets, that are gripped by tongs for conveyance along a first path, through a heating furnace and a first cooling area in an end to end relation to impart at least a partial temper thereto, and then are supported on their lower edges for conveyance in a broadside arrangement along a second path through a second cooling area en route to an inspection and packaging area. The present invention solves the problem of an excessively complicated storage and handling facility that would be required if the sheets are conveyed broadside along a second path in a direction transverse to the first path so as to have the second path of one production line interfere with the flow of sheets from a second production line and requiring the location of the first paths to be staggered, thus making it inconvenient to store and handle sheets at the loading and unloading ends of the production lines. In addition, the present invention solves the problem of an excessively long factory that would be required if the sheets treated are conveyed along a second cooling area in the same direction and orientation as in the first path.

The present invention solves the aforesaid problems by locating the second path for each production line approximately parallel to its first path and having its upstream end in alignment with the downstream end of the first path. The present invention arranges to rotate each sheet approximately 90° during its transfer from the first path to the second path. The transferred sheets are conveyed broadside along the second path in a direction parallel to the first path to reduce the length required for the second path to enable two parallel production lines to be aligned with one another. The storage areas for assembling sheets for different production lines can be coordinated at one end of a production plant and the unloading lines at the end of the second path can be coordinated with one another at the other end of the production plant. This facilitates the location of inspection and loading areas of the plant.

The present invention has special utility in the treatment of glass sheets and, optionally, the glass sheets may be shaped between the heating and cooling steps. These and other benefits of the present invention will become obvious in the light of a description of a preferred embodiment which follows.

DESCRIPTION OF THE DRAWINGS

In the drawings that form part of the description of a preferred embodiment of the present invention.

FIG. 3 is an end view of the carriage lifting means of FIG. 2, also showing the tong supporting carriage;

FIG. 5 is a plan view of the pad support means showing in full its position when it removes a sheet from the tong support carriage and in phantom a fragmentary view showing its sheet release position over a peg conveyor;

FIG. 6 is a side elevational view of a portion of a peg conveyor that forms a second path, also showing certain details of pad clamping means that form part of the pad support means of FIGS. 4 and 5;

FIG. 7 is a view similar to FIG. 2 showing the relative position of tong-engaging fingers to the superstructure of the tong support carriage at the transfer station with certain other parts omitted for clarity;

FIG. 9 is a side elevation of the carriage showing its raised position in phantom and pads clamping the upper edge of a glass sheet while the carriage is lowered and the tong engaging fingers engage the tongs.

DESCRIPTION OF THE PREFERRED EMBODIMENT

Figure 1:
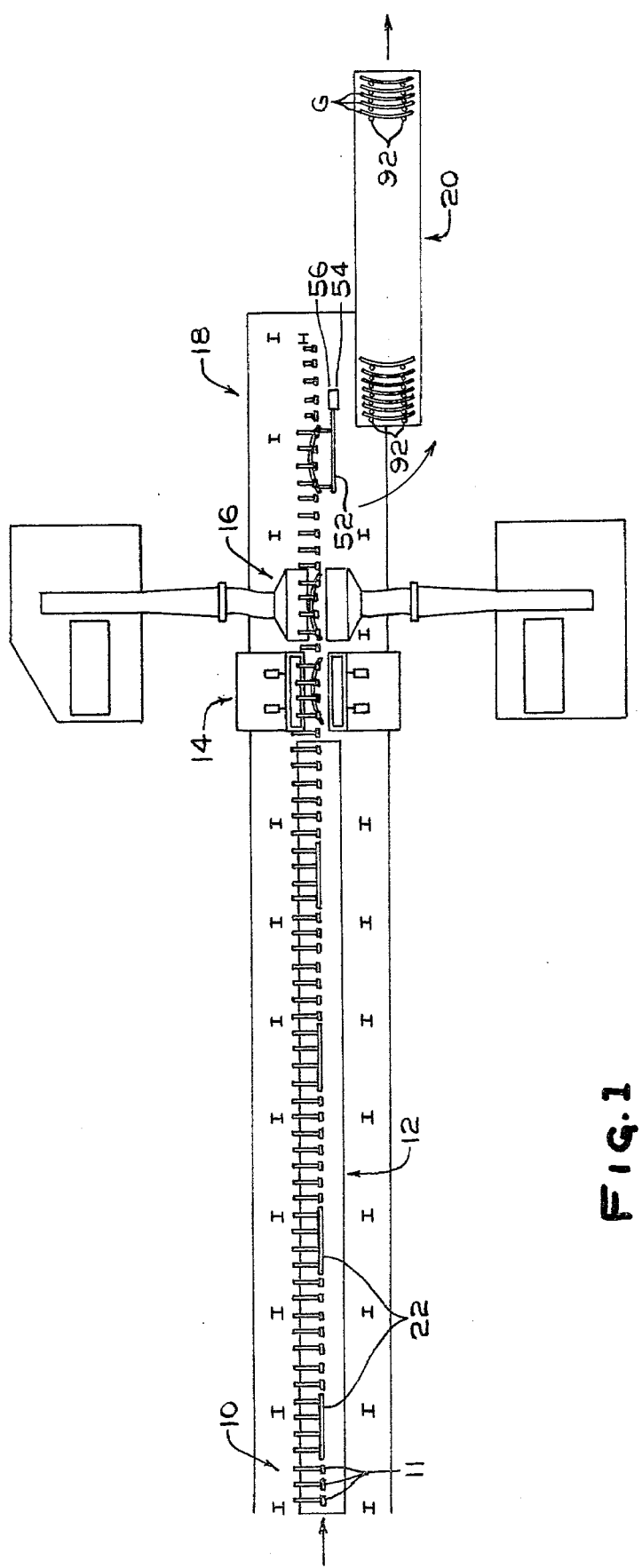
FIG. 1 is a plan view of apparatus for heating, press bending and tempering glass sheets that incorporates a sheet transfer device conforming to the present invention.
Figure 4:
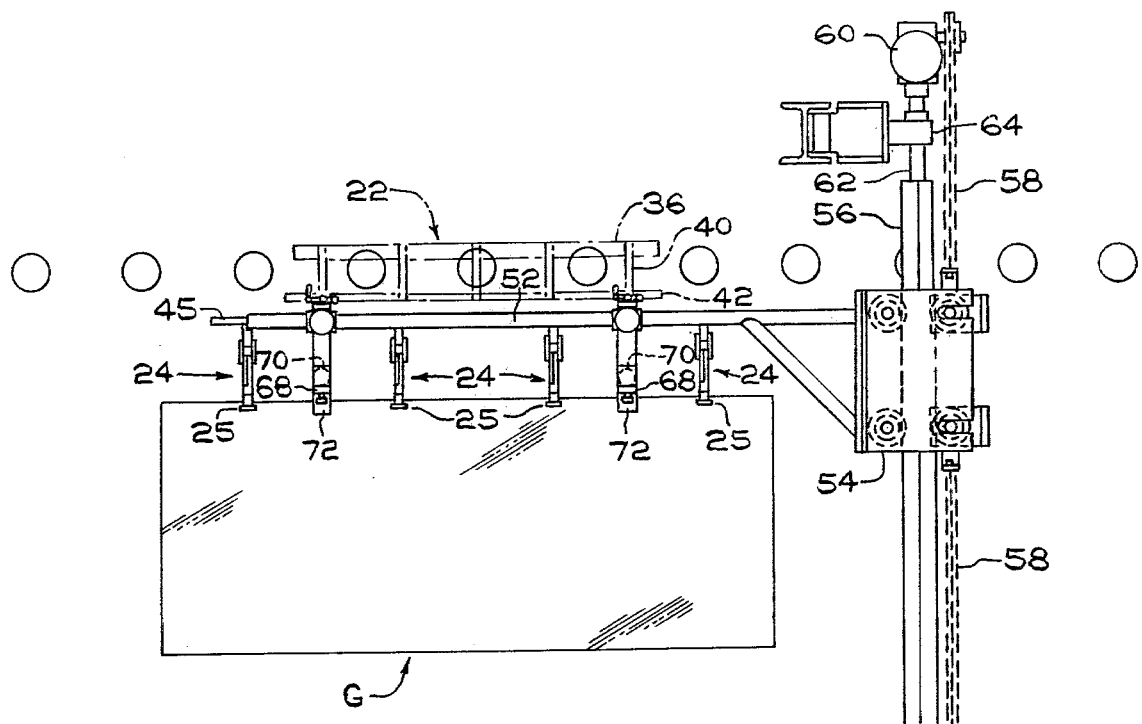
FIG. 4 is an elevational view of pad support means incorporating vertical drive motor means and rotary drive motor means located at the transfer station with the tong supporting carriage shown in phantom and other parts of the apparatus omitted for the sake of clarity to indicate the relative position of the pad support structure at the transfer station.

Referring to the drawings, a first conveyor 10 is shown comprising a plurality of rolls 11 that are longitudinally spaced parallel to a first path. The first conveyor 10 extends through a tunnel-like furnace 12, a sheet shaping station 14 and a first cooling area 16 which are in end to end relation with one another. The upstream end of the first conveyor comprises a loading station. The downstream end of the first conveyor occupies a portion of a transfer station 18, which forms an important part of the present invention. A series of glass sheets is conveyed in longitudinal end to end arrangement along the length of the first conveyor 10.

The illustrative embodiment of a production line of the present invention also comprises a second conveyor 20 of the peg conveyor type, whose upstream end is transversely aligned with the downstream end of the first conveyor 10 at transfer station 18. The second conveyor extends approximately parallel to the length of the first conveyor and provides means to convey the transferred glass sheets in a broadside direction along the length of a second path parallel to the first path. The second path extends through a second cooling area where the transferred sheets are permitted to cool at a natural cooling rate while they are conveyed en route to the downstream end of the second conveyor. Inspection and packaging stations (not shown) are located beyond the downstream end of the second conveyor 20.

A plurality of tong support carriages 22, each supporting a plurality of self-closing tongs 24 having glass gripping elements 25, convey a series of sheets along the first path defined by the conveyor roll 11 of the first conveyor 10. Glass sheets are mounted for tong engagement at a loading station at the upstream end of the first path and released from the tongs at the transfer station 18.

Each carriage 22 comprises an upper horizontal rail 36 supported for movement along the first conveyor 10 by rotation of the conveyor rolls 11. A cam 38 is provided on the upper surface of the upper rail 36 for engagement with various limit switches and other elements that control the movement of the carriages along the first path. Each carriage has a plurality of curved connectors 40 that extend vertically from the upper horizontal rail 36 to a lower horizontal bar 42. Tong suspension means 44 are supported in spaced relation along the length of the lower horizontal bar 42. The self closing tongs 24 are suspended from the tong suspension means 44. A preferred type of self closing tong is disclosed in U.S. Pat. No. 3,089,727 to William J. Hay.

Figure 2:
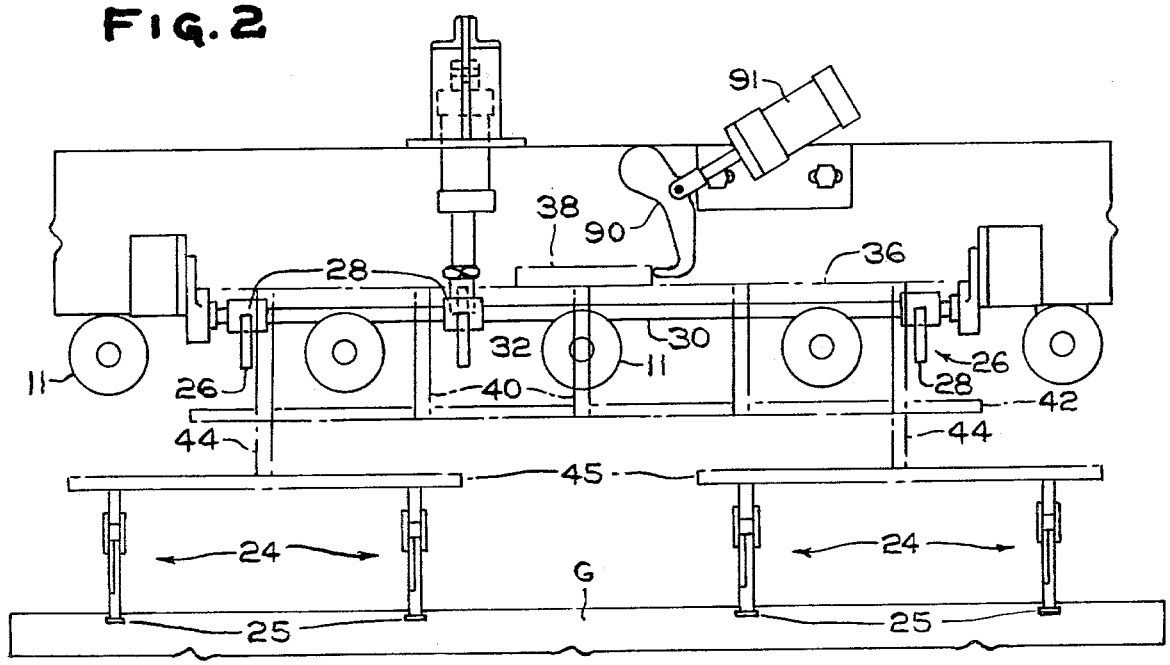
FIG. 2 is a side elevational view showing a tong supporting carriage in relation to carriage lifting means and with certain other parts omitted for clarity.

Referring to FIGS. 2 and 3, carriage lifting means 26 comprising a plurality of carriage engaging fingers 28 are mounted for rotation with a longitudinal pivot shaft 30. The carriage lifting means 26 is actuated for movement by a lever arm 32 that extends rearward from the longitudinal pivot shaft for actuation by a vertical piston 34 to cause the carriage engaging fingers 28 to move in unison between a carriage lifting position in which the fingers 28 engage the undersurface of the upper horizontal rail 36 of the carriage 22 to lift the latter to an upward position shown in phantom in FIG. 9, and a lowered position spaced below the upper horizontal rail 36 so that the latter resumes its position of support along a plurality of the conveyor rolls 11.

The tong suspension means 44 are preferably in the form of whiffletrees to suspend the self closing tongs 24 from the lower horizontal bar 42 of the carriage 22. The number of tong suspension means 44 that is provided depends upon the length and nature of the shape to be provided to the glass sheets supported by suspension from the tongs. As an alternative, each tong may be suspended to pivot about a vertical axis from a vertical bar fixed to the lower horizontal bar 42, depending on the severity of bend required.

The apparatus also comprises pad support means 50 depicted in FIGS. 4, 5, 6 and 9. The latter comprises a pivotable horizontal arm 52 rigidly attached at its inner end to a bracket type of carriage 54. The latter is vertically movable along a vertical track means 56 by a drive 58 reversibly driven by a vertical drive motor 60. The vertical track means 56 has vertical shaft extensions 62 extending upwardly and downwardly from the ends of the vertical track means and in longitudinal alignment therewith. The shaft extensions 62 extend through a pair of upper and lower pillow blocks 64. The latter are fixed to a support structure and the lower shaft extension 62 is drivingly engaged by a rotary drive motor 66. In this manner, the pivotable horizontal arm 52 moves vertically with carriage 54 along the vertical track means 56 by vertical drive motor 60 and in angular motion about a vertical axis outside said sheet to be transferred along a defined by said vertical track means and said vertical shaft extensions in response to actuation by the rotary drive motor 66.

A pair of small platforms 68 extend to one side of the pivotable horizontal arm 52. Each of these small platforms supports a small piston 70. In addition, a pair of fixed pads 72 is fixed to each of the small platforms 68 and corresponding movable pads 74 (actuated by each of the pistons 70) are pivotably movable between a recessed horizontal position and a vertical sheet clamping position where the movable pads 74 are parallel to the fixed pads 72. The pads are composed of metal pads covered with an insulating layer of a low heat capacity material, such as fiber glass, that does not mar glass at high temperatures. Adjustment cranks 76 and 77 (see FIG. 6) are provided to fix the vertical and horizontal positions of the small platforms 68.

Figure 8:
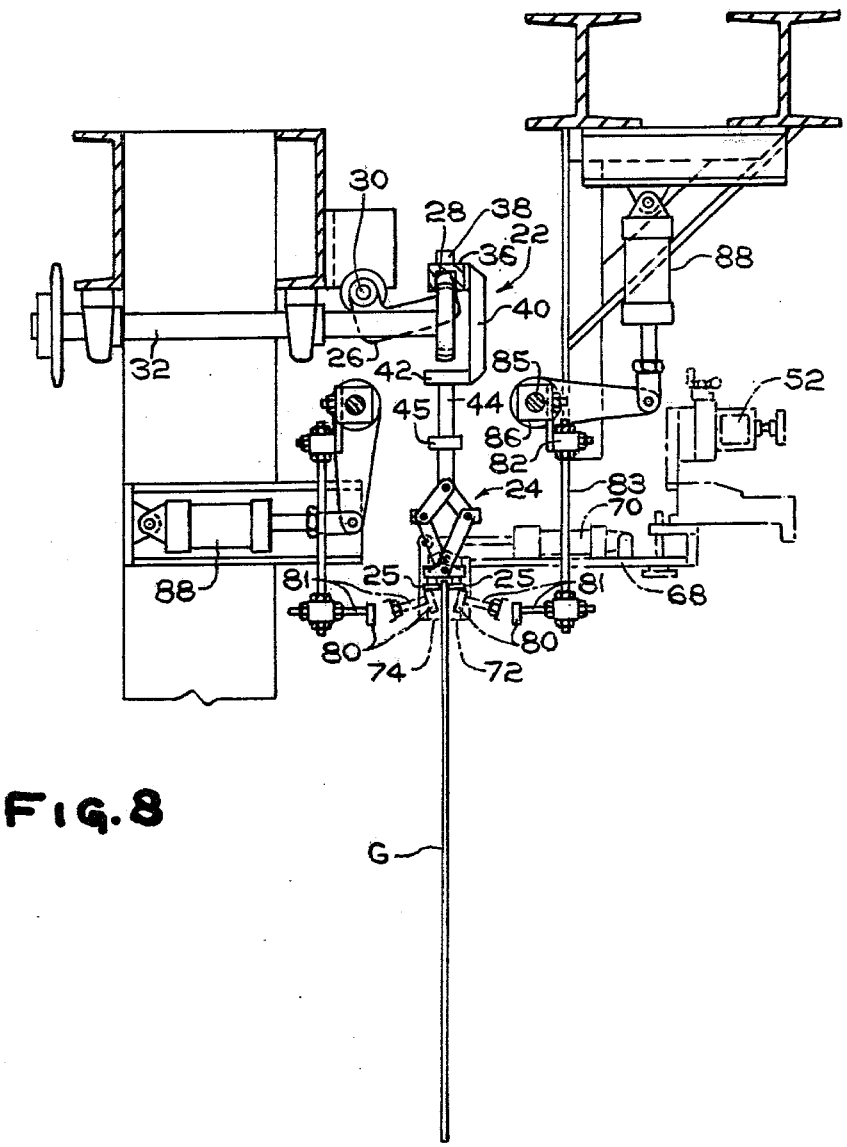
FIG. 8 is a cross-sectional view taken along the line 8—8 of FIG. 7.

The apparatus is also provided with a plurality of tong engaging fingers 80 which operate in pairs. These are depicted in FIGS. 7, 8 and 9. The tong engaging fingers 80 are attached to an end of one or more horizontal fingers 81. Each of the latter extends from an associated finger support lock 82. The latter also contains an upwardly extending vertical finger 83 which is connected at its upper end to a horizontal finger bar 84. The latter is connected to a horizontal pivot shaft 85 through a pair of connecting brackets 86. The horizontal pivot shaft 85 pivots in response to the movement of a piston 87 operating in a vertical piston cylinder 88.

The second conveyor 20 is in the form of a peg conveyor which comprises a plurality of aligned sets of spaced pegs 92 mounted on conveyor chains that extend lengthwise parallel to the first conveyor. The pegs 92 are arranged in sets of two or more pegs, each set being aligned parallel to horizontal shafts on which the peg conveyor chains are mounted. A support pad 93 is located at the bottom of a space 94 between adjacent sets of pegs. A limit switch 95 is provided to drive the peg conveyor in steps so that each set of pegs 92 containing a support pad 93 moves in stepwise relation to expose a space 94 between sets of pegs coordinated with the actuation of the limit switch 95.

The operation of the various elements comprising the apparatus is suitably coordinated by either timers or limit switches which operate in response to the actuation of other elements of the apparatus. For example, a lug 90 is provided in the transfer station 18 in position to be engaged by the cam 38 on the upper rail 36 of a tong support carriage 22 when the latter enters the transfer station 18. Engagement of the cam 38 against the lug 90 insures that the tong support carriage 22 is in proper position for the transfer operation to begin. This starts when a piston 91 associated with the lug 90 retracts the lug 90 and rotates the pivotable horizontal arm 52 with movable pads 74 disengaged to a position parallel to carriage 22. The carriage lifting means 26 are actuated to lift the upper horizontal rail 36 from the conveyor rolls 11 to the phantom position of FIG. 9.

At this moment the pivotable horizontal arm 52 is located parallel to the first path defined by the first conveyor 10 and the movable pads 74 are actuated by pistons 70 into their horizontal, upwardly pivoted positions disclosed in phantom in FIG. 6. With the carriage lifting means 26 holding the carriage 22 in disengaged position over the conveyor rolls 11, pistons 70 actuate the movable pads 74 to pivot into their vertical clamping position against the fixed pads 72 shown in full in FIG. 6. It is noted that the pads and their small platforms 68 that support them are located in longitudinally offset position to the position occupied by the tongs that engage the glass sheet when the carriage 22 is in the position defined by the engagement of the lug 90 against the cam 38 on the upper rail 36 of the carriage 22.

After the carriage is lifted and the movable pad means 74 clamped against the fixed pad means 72, the tong engaging fingers 80 disposed on opposite sides of the first path move into positions engaging the glass gripping elements 25 of the self closing tongs 24 and the carriage lifting means 26 is pivoted to lower the carriage 22 onto the conveyor rolls 11. This releases the tongs from glass gripping engagement and the glass sheet or sheets to be transferred is now secured by clamping engagement between the movable pad means 74 and the fixed pad means 72. The vertical drive motor 60 then moves in such a direction to lower the carriage 54 so as to clear the pivotable horizontal arm 52 and the remainder of the pad support means 50 into a position below the free hanging suspended position occupied by the released tongs 24. The rotary drive motor 66 is then actuated to pivot the pivotable horizontal arm 52 about a vertical axis spaced from said glass sheet from a first orientation where it extends parallel to the first path defined by the first conveyor 10 to a second orientation disposed approximately 90° from the first orientation where the pivotable horizontal arm 52 extends across and above the second conveyor 20.

The horizontal arm 52 pivots to a position in which the glass sheet clamped between the fixed pad means 72 and the movable pad means 74 reaches its second orientation where the pivotable horizontal arm 52 extends transverse to the upper run of the peg conveyor and the pivoted glass sheet is over a space 94 between adjacent sets of pegs 92.

The rolls 11 rotate to move the carriage 22 out of the transfer station 18 for return to the loading station along a return conveyor (not shown). The latter is well known in the art and forms no part of the present invention. A subsequent carriage can move into the transfer station 18 whenever the previous carriage is cleared from transfer station 18.

When the glass sheet has been pivoted approximately 90°, the vertical drive motor 60 lowers the pivotable horizontal arm 52 to lessen the space between the glass sheet and pad 93, and the pistons 70 are actuated to move the movable pads 74 into releasing position to drop the lower edge of the glass sheet onto the pads 93.

The vertical drive motor 60 then lifts the pivotable horizontal arm 52 to a position wherein the separated pad means 72 and 74 are both clear of the upper edge of the glass sheet resting on the pads 93 of the peg conveyor providing the second path of movement of the glass sheets to an inspection and packaging station. At approximately this time, the next carriage 22 arrives at the transfer station to initiate operation of the next cycle.

The rotary drive motor 66 rotates the carriage 54 and the pivoted horizontal arm 52 with the shaft extension 62 to return the pivotable horizontal arm to its first orientation where its length is parallel to the first path and the pad means 74 are high enough to clear the upper edge of the glass sheet. At the same time, the pivoting of the horizontal arm 52 actuates limit switch 95 to move the peg conveyor one step so that the next space 94 will be in a position to receive the next glass sheet pivoted thereover at the transfer station 18.

The form of the invention shown and described in this disclosure represents an illustrative preferred embodiment and certain modifications thereof. It is understood that various changes in dimensions and other changes may be made without departing from the gist of the invention as defined in the claimed subject matter which follows.

We claim:

1. A method of treating rigid sheets comprising conveying a series of said sheets in end to end relation while suspended from tongs along a first path extending through a hot atmosphere for sufficient time to heat each sheet in turn to an elevated temperature sufficient for tempering and then through a first cooling area, applying cold tempering medium toward said conveyed sheet at a rate sufficient to impart at least a partial temper to said sheet, while the sheet is conveyed through said first cooling area at the downstream end of said first path, clamping said sheet after it is conveyed through said first cooling area, relaxing said tongs to release said sheet from said tongs, lowering said clamped sheet so that its upper edge is below said tongs, pivoting said clamped sheet approximately 90 degrees about a vertical axis outside said sheet, transferring said clamped sheet onto a second path whose upstream end is transverse to the downstream end of said first path and which extends parallel to said first path through a second cooling area, releasing said clamped sheet so that it is supported on its bottom edge for conveyance along said second path in a direction approximately parallel to that of said first path, and conveying said released sheet in a broadside direction along said second path for further cooling in said second cooling area, the total length of said first path and said second path required to handle a predetermined number of sheets being less than that required for conveying said sheets in the same end to end relation through both said paths.

2. The method as in claim 1, further including shaping said conveyed sheet in said first path while the latter is at said elevated temperature and before applying cold tempering medium toward said conveyed sheet.

3. The method as in claim 1 or claim 2, wherein said rigid sheet is composed of glass.

4. Apparatus for treating rigid sheets comprising:

a first conveyor extending from its upstream end to its downstream end to define said first path, a second conveyor extending approximately parallel to said first conveyor from its upstream end to its downstream end to define said second path, the upstream end of said second conveyor being transversely aligned with the downstream end of said first conveyor, sheet transfer and pivot means for transferring at least one of said sheets from the downstream end of said first conveyor to the upstream end of said second conveyor, a plurality of tong-supporting carriages arranged for movement along said first conveyor, tongs supported by said carriages adapted to engage the upper portion of at least one of said sheets, said sheet transfer and pivot means comprising sheet clamping means, means to disengage said tongs from said upper portion after said sheet clamping means clamp said sheet, means to lower said sheet clamping means to move the upper edge of said sheet to a position below that occupied by said disengaged tongs, means to pivot said sheet approximately 90 degrees about a vertical axis offset from the position occupied by said sheet at said sheet transfer and pivot means and simultaneously transfer said sheet from the downstream end of said first path at an orientation parallel to said first path to the upstream end of said second path at an orientation transverse to said second path while said sheet is clamped between said clamping means, means to release said clamping means to support said sheet with its lower edge engaged by said second conveyor, and means for moving said glass sheet broadside of said second path while supported on said second conveyor.

5. Apparatus as in claim 4, wherein said first conveyor extends through a tunnel-like furnace and said first cooling area, said tunnel-like furnace being provided with heating elements for heating said sheet to an elevated temperature sufficient for tempering and said first cooling area is provided with means to supply cool tempering medium under pressure toward the opposite major surfaces of said sheet after the latter is heated to said elevated temperature at a rate sufficient to cool said sheet rapidly enough to develop at least a partial temper.

6. Apparatus as in claim 5, further including sheet shaping apparatus located between said furnace and said first cooling area along said first path defined by said first conveyor.

7. Apparatus for treating rigid sheets, comprising means for transferring a plurality of sheets of rigid material from a first conveyor for moving said sheets in end to end relation along said first path while the sheets are gripped by tongs suspended from carriages to a second conveyor for moving said glass sheets in a broadside direction along said second path parallel to said first path wherein the sheets are supported in an upright position along their lower edge comprising a sheet transfer station for moving one or more of said rigid sheets from said first path to said second path, said station having carriage lifting means pivotable about a horizontal axis parallel to said first path between a recessed position and a carriage lifting position, pad support means comprising a horizontal arm supporting fixed pad means to one side of said first path above the position occupied by the upper edge portion of said one or more rigid sheets when said carriage is disengaged from said carriage lifting means and in vertical alignment with said upper edge portion when said carriage lifting means occupies said carriage lifting position, movable pad means movably mounted to said pad support means for movement on the other side of said first path between an upward recessed position and a fixed pad means facing position to clamp the upper edge portion of said at least one rigid sheet between said fixed pad means and said movable pad means, a pair of tong engaging fingers disposed on opposite sides of said first path and movable between a recessed position and a tong-engaging position to relax said tongs so as to separate said tongs from said at least one rigid sheet when said pad means engages the upper edge portion of said at least one rigid sheet, said support means further comprising vertical track means, a carriage mounted for vertical movement along said vertical track means, said horizontal arm being fixed to said carriage and supporting said pad means, and means for pivoting said arm about a vertical pivot axis defined by said vertical track means, means to lower said carriage lifting means and said pad support means in unison while said pad means clamp said upper edge portion of said rigid sheet therebetween and said tong engaging fingers maintain their tong-engaging position, means to lower said horizontal arm to a position wherein said clamped glass sheet is below that occupied by said engaged and relaxed tongs while said horizontal arm is at a first orientation, means to pivot said horizontal arm of said lowered pad support means approximately 90 degrees to a second orientation to align said at least one rigid sheet over said second path, means to disengage said movable pad means from said fixed pad means to deposit said glass sheet onto said second conveyor, means to raise said horizontal arm to a position wherein said pad means are completely clear of the upper edge of said at least one glass sheet when its bottom edge rests on said second conveyor, means to return said pad support means to said position where said horizontal arm supports said fixed pad means to said one side of said first path and said movable pad means to said upward recessed position, means to index said second conveyor into position to receive the next sheet processed along said first path, and means to return said pair of tong engaging fingers to their said recessed position.

8. Apparatus as in claim 7, further including
 means to lower said horizontal arm with said at least one rigid sheet engaged by said pad means while said horizontal arm is at said second orientation until said at least one rigid sheet is supported with its lower edge adjacent to said second conveyor across said second path.

9. In combination with apparatus for treating a plurality of rigid sheets as in claim 7, a tunnel-like furnace and said first cooling area disposed in longitudinally aligned relation along said first path for imparting at least a partial temper to said sheet before it arrives at said transferring means.

10. In combination with apparatus for treating a plurality of rigid sheets as in claim 9, further including sheet shaping means located between said furnace and said cooling area along said first path for changing the shape of said sheets between said furnace and said first cooling area.

* * * * *

UNITED STATES PATENT AND TRADEMARK OFFICE
CERTIFICATE OF CORRECTION

PATENT NO. : 4,325,723

DATED : April 20, 1982

INVENTOR(S) : John D. Kellar and Gordon F. Pereman

It is certified that error appears in the above-identified patent and that said Letters Patent are hereby corrected as shown below:

In Column 9, line 53, after "said" insert --pad--.

Signed and Sealed this

Twenty-fourth Day of August 1982

|SEAL|

Attest:

GERALD J. MOSSINGHOFF

Attesting Officer

Commissioner of Patents and Trademarks